US011004255B2

(12) United States Patent
Cichocki et al.

(10) Patent No.: US 11,004,255 B2
(45) Date of Patent: May 11, 2021

(54) EFFICIENT RENDERING OF HIGH-DENSITY MESHES

(71) Applicant: Microsoft Technology Licensing, LLC, Redmond, WA (US)

(72) Inventors: Adam Andrzej Cichocki, Reutlingen (DE); Marc Schirski, Reutlingen (DE); Dag Birger Frommhold, Metzingen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/393,649

(22) Filed: Apr. 24, 2019

(65) Prior Publication Data

US 2020/0342656 A1 Oct. 29, 2020

(51) Int. Cl.
| | |
|---|---|
| *G06T 15/20* | (2011.01) |
| *G06F 3/01* | (2006.01) |
| *G06T 15/40* | (2011.01) |
| *G06T 17/00* | (2006.01) |
| *G06T 17/10* | (2006.01) |

(52) U.S. Cl.
CPC .............. *G06T 15/20* (2013.01); *G06F 3/013* (2013.01); *G06T 15/40* (2013.01); *G06T 17/005* (2013.01); *G06T 17/10* (2013.01)

(58) Field of Classification Search
CPC ....... G06T 15/20; G06T 15/40; G06T 17/005; G06T 17/10; G06F 3/13
USPC ........................................................ 345/420
See application file for complete search history.

(56) References Cited

U.S. PATENT DOCUMENTS

| | | | |
|---|---|---|---|
| 2010/0328428 A1 | 12/2010 | Booth et al. | |
| 2016/0005140 A1* | 1/2016 | Engh-Halstvedt | G06T 15/005 |
| | | | 345/506 |
| 2016/0086299 A1* | 3/2016 | Sharma | G06T 1/20 |
| | | | 345/422 |
| 2017/0365090 A1* | 12/2017 | Hazel | G06T 15/60 |
| 2019/0035363 A1* | 1/2019 | Schluessler | G06T 15/405 |
| 2019/0318526 A1* | 10/2019 | Hunt | G06T 15/005 |

OTHER PUBLICATIONS

Haar, et al., "GPU-Driven Rendering Pipelines", In Proceeding of SIGGRAPH, Advances in Real-Time Rendering in Games, Aug. 2015, 60 Pages.
Stich, et al., "Spatial Splits in Bounding Volume Hierarchies", In Proceeding of High-Performance Graphics, Aug. 2009, 7 Pages.
Wihlidal, Graham, "Optimizing the Graphics Pipeline with Compute", In Proceeding of the Game Developers Conference, Mar. 2016, 99 Pages.
Andujar, et al., "LOD Visibility Culling and Occluder Synthesis", In Journal of Computer-Aided Design, vol. 32, Issue 13, Nov. 1, 2000, pp. 773-783.
"International Search Report and Written Opinion Issued in PCT Application No. PCT/US20/022877", dated May 26, 2020, 14 Pages.

* cited by examiner

*Primary Examiner* — Hai Tao Sun
(74) *Attorney, Agent, or Firm* — Alleman Hall Creasman & Tuttle LLP

(57) ABSTRACT

Examples are disclosed that relate to culling of polygons for efficient rendering of a high-density polygon mesh using one or more compute shaders. Examples include monoscopic and stereoscopic rendering, foveated and non-foveated rendering, and selectively utilizing one or more computer shaders to rasterize very small triangles instead of using a regular rendering pipeline for increased performance.

20 Claims, 6 Drawing Sheets

EFFICIENT RENDERING OF HIGH-DENSITY MESHES

BACKGROUND

In computer graphics, a three-dimensional (3D) model of a virtual scene may be represented by a mesh. The use of meshes to represent 3D model may be advantageous, as computer graphics software and hardware may be designed to process meshes for two-dimensional (2D) image rendering more efficiently than other types of modeling schemes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to culling of polygons for efficient rendering of a high-density polygon mesh organized according to a hierarchical structure, wherein the high-density polygon mesh represents a three-dimensional (3D) model. In one example where stereo image frames are rendered for each eye of a viewer, the hierarchical structure is loaded from memory to one or more compute shaders to perform culling operations separately for each eye prior to rendering the stereo image frames. In particular, for each eye, a depth pyramid is generated using the hierarchical structure. Visibility testing using the depth pyramid is performed on the hierarchical structure to identify polygons and/or nodes of polygons that are visible in a current image frame. The visible polygons identified from the visibility testing in the current image frame are then rendered. In this way, the stereo image frames are rendered for the viewer's eyes based upon loading the hierarchical structure from memory to the one or more compute shaders a single time, which reduces memory load time.

In another example, the culling of polygons is based on a determined position of a feature of an eye. In particular, a position of a feature of an eye is determined via an eye tracker. A current image frame includes a plurality of regions that are dynamically determined based on the position of the feature of the eye. Visibility testing in regions closer to the position of the feature of the eye are performed on the hierarchical structure with a finer granularity to identify polygons and/or nodes of polygons that are visible in a current image frame. Visibility testing in regions further from the position of the feature of the eye are performed on the hierarchical structure with a coarser granularity to identify polygons and/or nodes of polygons that are visible in a current image frame. The visible polygons identified from the visibility testing in the current image frame are rendered. According to such an approach, the regions further from the tracked position of the feature of the eye may be rendered with lower resolution since the eye may not have the ability to perceive details in such peripheral regions. In this way, additional polygons and/or nodes of polygons may be culled in the peripheral regions for additional performance gains.

In yet another example, one or more visible polygons identified from the visibility testing in the current image frame may be dynamically selected to be rendered using one or more compute shaders of the computing system instead of a regular rendering pipeline. As one example, very small polygons that are still visible in the current image frame may be selected for computer shader rasterization. Other larger polygons that are not selected for compute shader rasterization may be instead rendered using the rendering pipeline. In some cases, using the compute shader(s) for rendering the selected polygons may be more efficient than using the rendering pipeline, because the rendering pipeline may inefficiently render very small polygons (e.g., multiple polygons within a block of pixels), due, for example, to low GPU lane utilization, and/or redundant data fetching.

DETAILED DESCRIPTION

Figure 1:
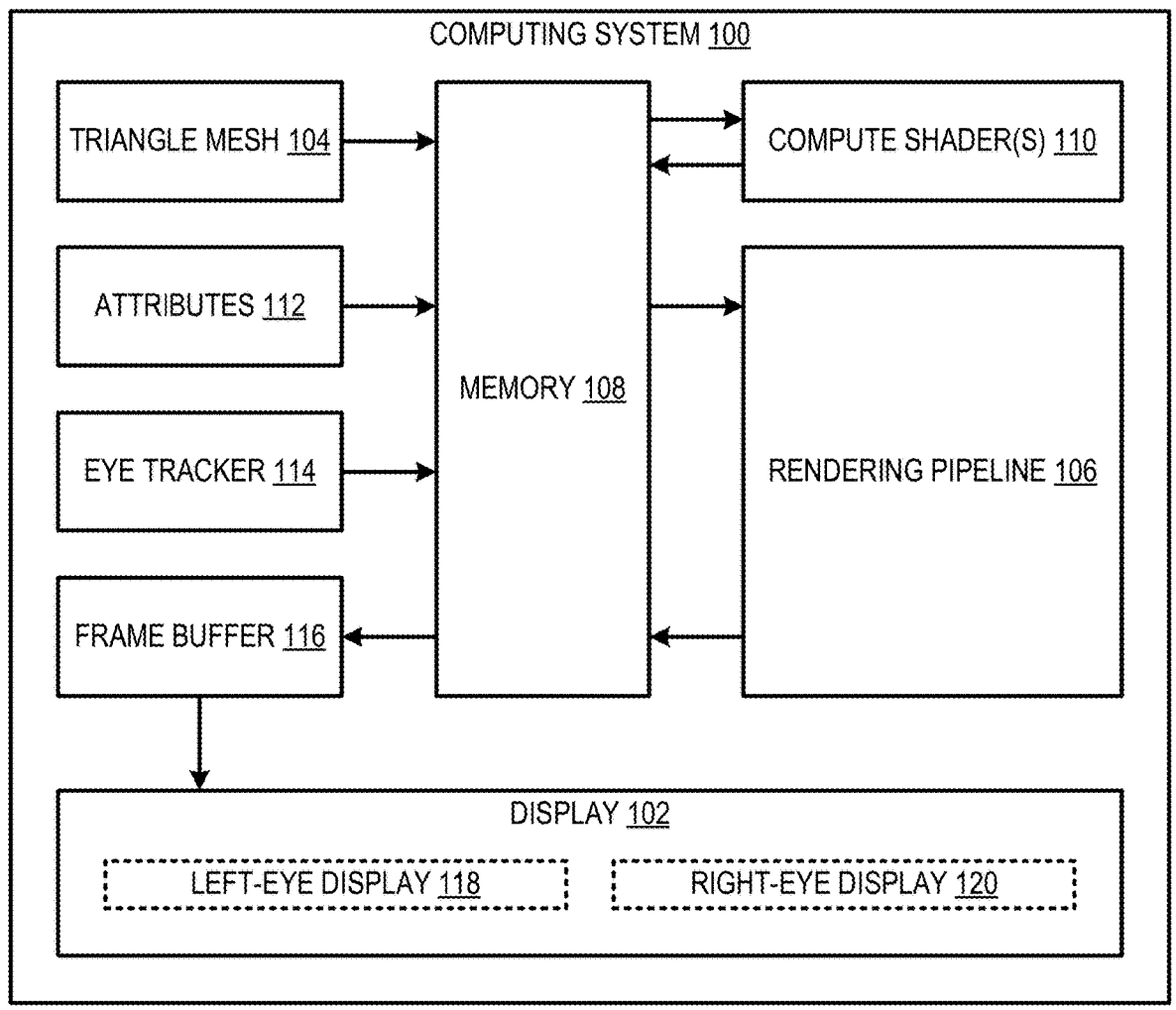
FIG. 1 schematically shows an example computer graphics rendering architecture.

In some examples, a three-dimensional (3D) model may be highly detailed, such that a representative polygon mesh may have a density that drastically exceeds a sampling rate for rendering the 3D model to a two-dimensional (2D) image. Due to the high density of the polygon mesh, a processing time for a graphics pipeline to render the mesh may be significant. For example, bottlenecks may occur due to graphics processing units (GPUs) of the graphics pipeline having to perform numerous draw operations for polygons that correspond to tiny details or distant objects in the mesh that may not even be perceivable in the rendered 2D image. Further, loading high-density meshes for processing may be slow for some models.

Accordingly, examples are disclosed that relate to culling of polygons for efficient rendering of a high-density polygon mesh organized according to a hierarchical structure and representing a 3D model. As one particular example, the polygon mesh may include a triangle mesh. Such examples are described herein in the context of triangle meshes. Examples include monoscopic and stereoscopic rendering, foveated and non-foveated rendering, and utilizing one or more computer shaders to rasterize small triangles.

By culling triangles and/or nodes of the triangle mesh prior to entering the rendering pipeline, the amount of data that the rendering pipeline consumes in order to render the resulting image frame may be reduced.

In some implementations, the triangle and/or node culling and rendering approach may be applied to stereo image rendering. In such implementations, the compute shader(s) that is/are used to perform such triangle and/or node culling may be configured to access the triangle mesh data/load the triangle mesh data to local memory only one time to perform processing twice (once for each eye), and output two separate lists of visible triangles (one for each eye) all in the same run of the compute shader(s). In this way, memory loading time, which is a significant portion of the processing time, may be reduced for stereo image rendering.

Furthermore, in some implementations, the triangle and/or node culling and rendering approach may be dynamically adjusted based on a tracked position of a feature of an eye for additional performance gains. An image frame may be divided into a plurality of regions dynamically determined based on the position of the feature of the eye. As an example, the feature may be a fovea of a retina of the eye. Visibility testing in regions closer to the position of the feature of the eye may be performed on the hierarchical structure with a finer granularity. Likewise, visibility testing in regions further from the position of the feature of the eye may be performed on the hierarchical structure with a coarser granularity. According to such an approach, the regions further from the tracked position of the feature of the eye may be rendered with lower resolution since the eye may not have the ability to perceive details in such peripheral regions. In this way, additional triangles may be culled in the peripheral regions for additional performance gains.

FIG. 1 schematically shows an example computer graphics rendering architecture that may be implemented in a computing system 100 to perform efficient triangle culling and image rendering as disclosed herein. The computing system 100 may be configured to render images to a display 102 based on a triangle mesh 104 representing a 3D model of a virtual object or scene. The triangle mesh 104 may be a high-density triangle mesh having a triangle density that drastically exceeds a sampling rate for rendering the 3D model to a 2D image. The 3D model may be preprocessed to generate the triangle mesh 104 in a manner that allows for the triangle mesh to be efficiently processed for image rendering. In one example, the preprocessing may include a compaction technique that results in a compacted mesh organized according to a hierarchical structure. The triangle mesh 104 may be organized according to any suitable hierarchical structure. In one example, the hierarchical structure includes a plurality of levels, wherein each level of the plurality of levels may include one or more nodes, and each node of the one or more nodes may include one or more triangles (or other polygons, depending upon the type of mesh). Such nodes also may be referred to herein as polygon nodes or triangle nodes. As a more specific example, the hierarchical structure may be a bound volume hierarchy (BVH), where leaf nodes reference small groups of nearby triangles. These nodes are then grouped as small sets and enclosed within larger bounding volumes. These, in turn, are also grouped and enclosed within other larger bounding volumes in a recursive fashion, eventually resulting in a tree structure with a single bounding volume at the top of the tree. Such a BVH may be simple to construct, have a low memory footprint, allow for refitting in animations, and be well suited for GPU-based computer graphics rendering architectures.

To facilitate rendering of the triangle mesh 104, the computing system 100 may include a computer graphics rendering pipeline 106, a memory 108 associated with the rendering pipeline 106, and one or more compute shaders 110.

The memory 108 may be any suitable type of memory configured to store any suitable type of information related to image rendering. For example, the memory 108 may include one or more different buffers dedicated to the different attributes 112 and/or other aspects of the triangle mesh 104. As a more specific example, the memory 108 may include depth buffers.

For image rendering, the triangle mesh 104 representing the 3D model may be loaded into the memory 108. Additionally, in some implementations, a plurality of rendering attributes 112 that characterize the triangle mesh 104 may be loaded into memory 108. For example, the rendering attributes 112 may include lighting information, such as position, direction, color, intensity, etc.; camera information, such as position, view, up, projection type, etc.; material/texture information, such as shininess, translucency, textures, etc.; and rendering information, such as resolution, post-effects, primitive count, etc.

Figure 2:
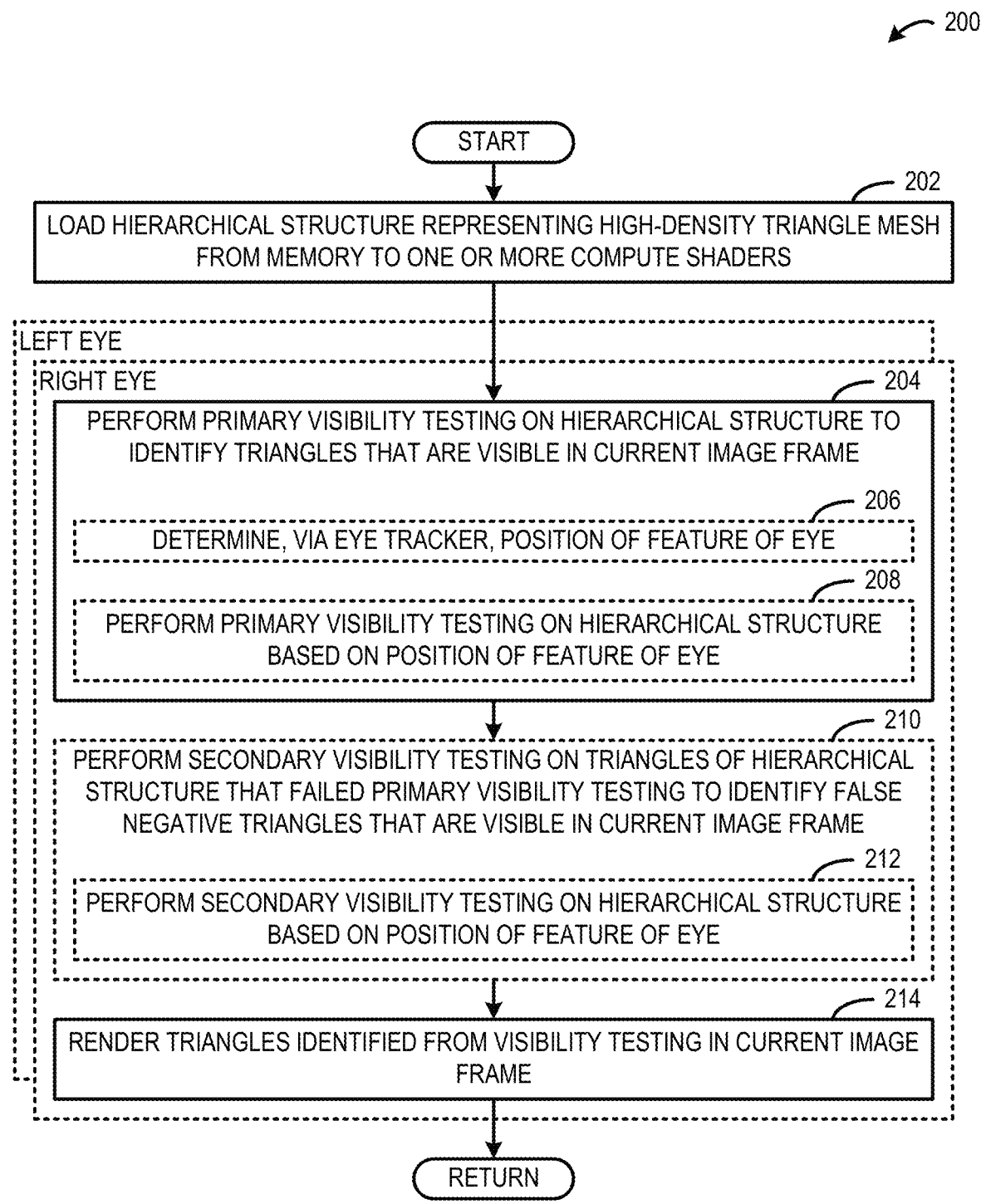
FIG. 2 is a flowchart showing aspects of an example method for rendering imagery based on a high-density mesh representing a three-dimensional (3D) model.

As discussed above, in order to efficiently render the high-density triangle mesh 104, triangles may be culled from the triangle mesh 104 prior to being rendered by the rendering pipeline 106. As one example, triangles may be culled from the triangle mesh 104 as part of an efficient rendering method that is shown in FIG. 2 and discussed in further detail below. Such triangle culling may be performed by one or more compute shaders 110, wherein a compute shader is a program that is configured to run on some stage of a graphics processor for computing arbitrary information.

By culling triangles from the triangle mesh via the computer shader(s) prior to rendering 110, processing bottlenecks in the rendering pipeline 106 may be reduced and the rendering pipeline 106 may be made available to perform other operations. The general processing nature of the compute shader(s) 110 allows all draw operations to be treated as regular data that can be pre-built, cached and reused, and generated on the GPU. The triangle culling approach performed by the compute shader(s) 110 may produce a list of visible triangles to be rendered in a current image frame. The culling approach may be performed as part of either monoscopic or stereoscopic image rendering.

The list of visible triangles produced by the compute shader(s) 110 may be provided as input to the rendering pipeline 106 to render an image frame. The rendering pipeline 106 may take any suitable form. In one example, the rendering pipeline 106 may be a GPU-based rendering pipeline. The GPU-based rendering pipeline may allow for complex computations to be performed by graphics processing hardware of the computing system that frees up a CPU of the computing system to perform other calculations. The GPU-based rendering pipeline may be capable of performing hundreds of operations in parallel, and may be specially designed for rendering rasterized images.

In one example, the rendering pipeline may include a vertex processing stage, primitive processing stage, rasterization stage, fragment processing stage, and pixel processing stage. The vertex processing stage may be configured to perform vertex projection and assign attributes (e.g., color, texture, depth) to each vertex. The primitive processing stage may be configured to assemble a primitive from vertices and perform perspective division, viewport transformation, and clipping. The rasterization stage may be configured to generate fragments from primitives. In some cases, multiple fragments may be generated per pixel. The rasterization stage may be further configured to assign attributes (e.g., color, texture, depth) to each fragment and perform interpolation along each primitive. The fragment processing stage may be configured to divide the fragment into pixels and assign effects to the pixels. The pixel processing stage may be configured to perform alpha testing and blending operations on the pixels of the image frame.

The GPU-based rendering pipeline is provided as an example and is meant to be non-limiting, as the rendering pipeline 106 may take any suitable form. As another example, the rendering pipeline may be configured to perform ray tracing to render an image frame.

In some implementations, one or more triangles may be dynamically selected from the list of visible triangles produced as a result of the visibility testing for compute shader rasterization performed by the compute shader(s) 110 instead of being provided to the rendering pipeline 106. In one example, triangles that are very small but may still be visible in a final rendered image may be identified and selected for compute shader rasterization. In this manner, a dynamic decision may be made to rasterize on a compute shader triangle (or other polygon) data that is formatted for a rasterization pipeline. In other examples, the compute shader(s) 110 may be configured to render at least some of the list of visible triangles using another form of customization. In some cases, using the compute shader(s) 110 for rendering may be more efficient than using the rendering pipeline 106, because the rendering pipeline 106 may inefficiently render very small triangles (e.g., multiple triangles within a block of pixels), due, for example, to low GPU lane utilization, and/or redundant data fetching (three vertices of a triangle for multiple triangles to cover a single pixel).

In some such implementations where the compute shader(s) 110 render at least some of the list of visible triangles, the compute shader(s) 110 also may be configured to perform shading of pixels while performing rasterization of very small triangles. This results in the compute shader(s) 110 outputting rendered, shaded pixels. In other implementations, the rendered pixels may be shaded after being output from the compute shader(s) 110. For example, the compute shader(s) 110 may output the rendered pixels to a visibility buffer stored in memory 108. Further, the rendered pixels may be retrieved from the visibility buffer by a processing unit, which may or may not be the compute shaders, to be shaded after rendering.

The rendered image frame output from the rendering pipeline 106 (and/or the compute shader(s) 110) may be stored in a frame buffer 116. The frame buffer 116 may be configured to provide the rendered image frame to the display 102 for presentation to a viewer.

In some implementations, the display 102 may be a stereo display that includes a left-eye display 118 and a right-eye display 120. For example, such a stereo display may be included in a near-eye display device, such as display device 500 shown in FIG. 5 and described in further detail below. In such implementations, as mentioned above, the triangle and/or node culling and rendering examples disclosed herein may be applied to stereo image rendering. In particular, the compute shader(s) 110 may access the memory 108 a single time to load the triangle mesh 104 into local memory (e.g., local on-chip cache for the computer shader(s)), and the compute shader(s) 110 may perform separate triangle culling operations twice (once for each eye), and output two separate lists of visible triangles (one for each eye) all in the same processing run. The two lists of visible triangles may differ based on the different perspective/position of the eyes relative to the 3D model represented by the triangle mesh 104. Further, the rendering pipeline 106 may render the two lists of visible triangles to produce different images for each eye that are displayed via the left-eye display 118 and the right-eye display 120. Since the triangle mesh 104 is loaded from memory to the computer shader(s) once and processed twice to render the stereo images, memory loading time may be reduced relative to an approach where the triangle mesh is loaded from memory each time an image is rendered.

In some implementations, the triangle and/or node culling and rendering approach may be dynamically adjusted based on a tracked position of a feature of an eye for additional performance gains. To facilitate such an approach, the computing system 100 may include an eye tracker 114 configured to track the position of a feature of one or more eyes of a viewer of the display 102, such as a pupil of the eye, and/or a fovea of a retina of the eye. In some examples, the eye tracker 114 may be configured to determine the position of the fovea via direct measurement, and/or to derive the position of the fovea from the measured position of the pupil or based on measuring another aspect of the eye. It will be appreciated that the eye tracker 114 may be configured to determine the position of any suitable feature of the eye. Further, the eye tracker 114 may employ any suitable eye tracking technology to track the position of the feature of the eye. The eye tracker 114 may be configured to provide the tracked position of the feature of the eye to the memory 108, which may be used by the compute shader(s) 110 as part of the herein described triangle culling approach.

FIG. 2 shows an example method 200 for rendering imagery based on a high-density triangle mesh representing a 3D model. For example, the method 200 may be performed by the computing system 100 of FIG. 1. At 202, the method 200 includes loading a hierarchical structure representing a high-density triangle mesh from memory to one or more compute shaders of a computing system.

At 204, the method 200 includes performing, via the one or more compute shaders of the computing system, visibility testing on the hierarchical structure to identify triangles and/or nodes of the hierarchical structure that are visible in the current image frame. The hierarchical structure may include a plurality of levels, wherein each level may include one or more nodes, and each node may include one or more triangles. In one example, the hierarchical structure may be a bound volume hierarchy, and each of the nodes may include a bounding volume of one or more triangles. In some implementations, visibility testing may be performed in multiple phases. In such implementations, the visibility testing performed at step 204 may be referred to as primary visibility testing.

Figure 3:
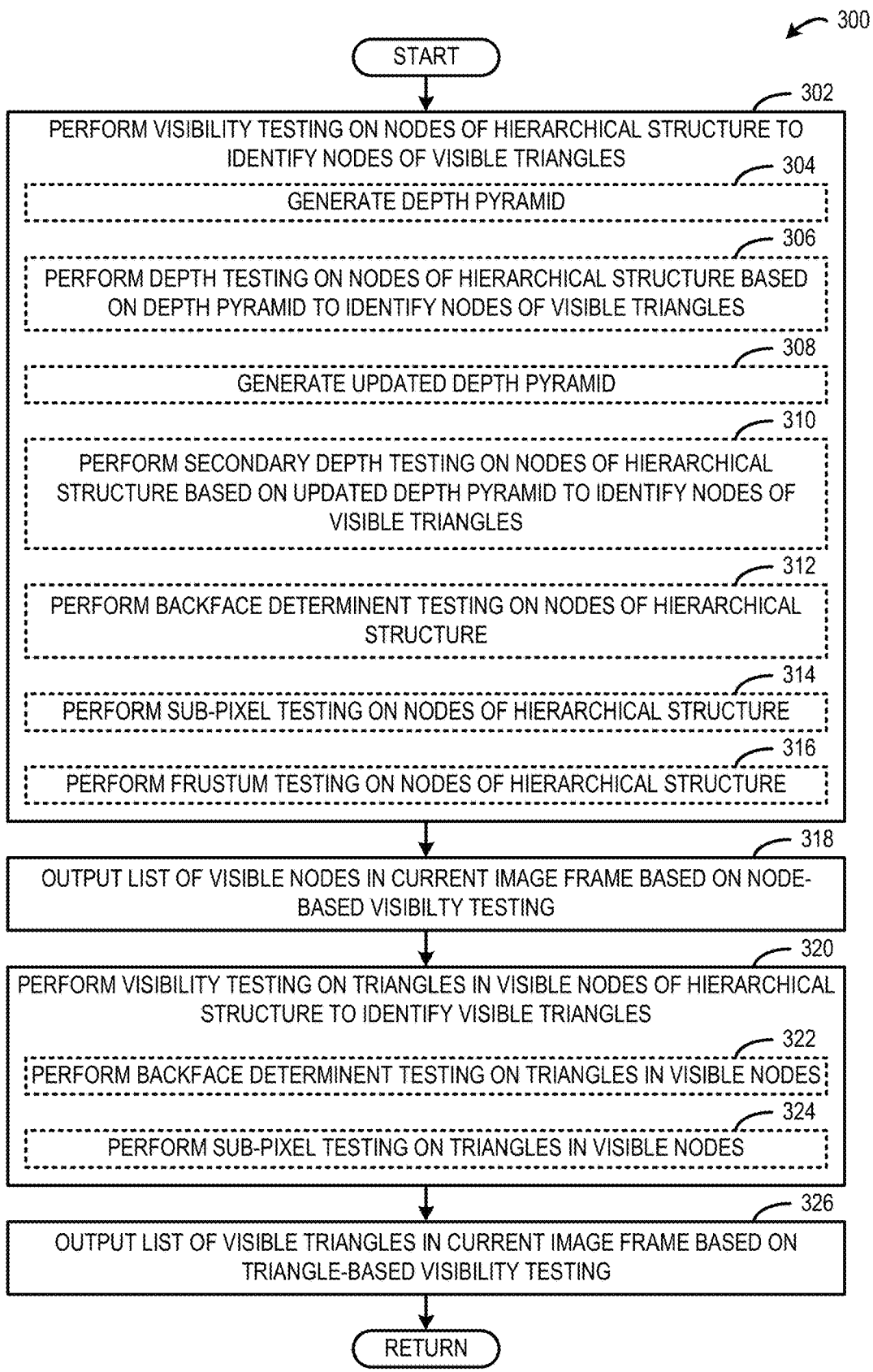
FIG. 3 is a flowchart showing aspects of an example method for performing visibility testing on a hierarchical structure representing a high-density mesh.

Any suitable type of visibility testing may be performed at step 204 on the hierarchical structure representing the high-density triangle mesh to identify triangles that are visible in the current image frame. FIG. 3 shows an example method 300 for performing visibility testing on a hierarchical structure representing a high-density triangle mesh. Some or all of the method 300 may be performed as part of performing step 204 and/or optional step 210 of the method 200 of FIG. 2.

At 302, the method 300 includes performing visibility testing on nodes of the hierarchical structured to identify nodes of visible triangles. Any suitable form of node-based visibility testing may be performed to identify nodes of visible triangles. For example, performing visibility testing optionally may include performing depth testing on nodes of the hierarchical data structure to identify visible nodes. Such depth testing may involve, at 304, generating a depth pyramid. In one example, generating the depth pyramid may include re-projecting depth data for a previously-rendered image frame of the 3D model based on a change in virtual perspective of a virtual camera between the previously-rendered image frame and a current image frame to generate a depth pyramid. In one example, the depth data is stored in a depth buffer in the memory. The depth pyramid may include a plurality of levels starting at a resolution of the depth buffer, and going all the way down to a single pixel. Each level of the depth pyramid may include a minimum or maximum depth of all corresponding pixels in the level. Further, at 306, starting at a highest level of the hierarchical structure, and traversing the hierarchical structure depth testing may be performed using the depth pyramid. If a node is determined to be fully occluded based on the depth testing, then the node and all nodes connected to the node in lower levels of the hierarchy may be considered to have failed the depth testing. Otherwise, if a node is determined to be visible or partially occluded, then the depth testing continues at the next connected node deeper in the next level of the hierarchy. The depth testing may be performed in this manner until the hierarchical structure is traversed and all nodes including visible triangles are identified.

Furthermore, in some implementations, performing depth testing optionally may include, at 308, generating an updated depth pyramid. In one example, generating the updated depth pyramid includes updating depth data based on a current virtual perspective of the virtual camera for the current image frame. In one example, the updated depth pyramid may be generated from the updated depth buffer for the current image frame. At 310, performing depth testing optionally may include performing secondary depth testing using the updated depth pyramid on nodes of triangles of the hierarchical structure that failed the primary visibility testing performed at step 306 to identify false negative triangles that are visible in the current image frame.

In some implementations, at 312, performing the visibility testing may include performing backface determinant testing on nodes of the hierarchical structure. Backface determinant testing may be performed to identify bounding volumes (or other groupings) including triangles in the triangle mesh that face away from the position of the virtual camera such that the triangles in the bounding volumes (or other groupings) are completely occluded by front-facing triangles and are not visible in the current image frame. Any suitable type of backface determinant testing may be performed to identify bounding volumes (or other groupings) of backfacing triangles to cull from the triangle mesh.

Further, in some implementations, at 314, performing visibility testing optionally may include performing sub-pixel testing on nodes and/or triangles of the hierarchical structure. Sub-pixel testing may be performed to identify bounding volumes (or other groupings) that do not generate pixel coverage. In one example, a sub-pixel test may include snapping a minimum and a maximum of a screen space bounding box of a bounding volume (or other grouping) to a nearest pixel corner. If the minimum and maximum snap to either the same horizontal or vertical edge, then the bounding volume (or other grouping) does not enclose a sampling position, and therefore does not contribute to pixel coverage. Any other suitable type of sub-pixel test may be performed to identify bounding volumes (or other groupings) of triangles to cull from the triangle mesh.

Additionally, in some implementations, at 316, performing visibility testing optionally may include performing frustum testing on nodes of the hierarchical structure. Frustum testing may be performed to identify bounding volumes (or other groupings) that are positioned outside of a frustum of the virtual perspective of the virtual camera for the current image frame. Any suitable type of frustum test may be performed to identify bounding volumes (or other groupings) of triangles to cull from the triangle mesh.

At 318, the method 300 includes outputting a list of visible nodes in the current image frame based on the node-based visibility testing. In one example where the hierarchical structure is a BHV, a list of visible leaf bounding volumes may be produced. By performing the visibility testing initially at the node-level, the BHV may be traversed quicker to cull triangles and/or nodes of triangles more efficiently.

Once the visible nodes are identified from the node-based visibility testing, visibility testing may be performed at the triangle level. At 320, the method 300 includes performing visibility testing on triangles in visible nodes of the hierarchical data structure to identify visible triangles. Any suitable form of triangle-based visibility testing may be performed to identify visible triangles.

In some implementations, at 322, the method 300 optionally may include performing backface determinant testing on triangles in the visible nodes to identify visible triangles within each visible node. In some implementations, at 324, the method 300 optionally may include performing sub-pixel testing on triangles in the visible nodes to identify visible triangles within each visible node. At 326, the method 300 includes outputting a list of visible triangles in the current image frame based on the triangle-based visibility testing.

Returning to FIG. 2, in some implementations, visibility testing may be performed non-uniformly across the hierarchical structure based on a position of a feature of an eye of a viewer of the current image frame. As one example, visibility testing may be performed with varying levels of granularity across different regions of the current image frame based on where the eye is looking on the current image frame. To facilitate such functionality, in some implementations, at 206, the method 200 optionally may include determining, via an eye tracker of the computing system, a position of a feature of an eye of a viewer. As one example, the feature may include a fovea of a retina of the eye. In such examples, the culling and rendering approach may be referred to as foveated rendering. In other examples where culling is performed uniformly across an image, the culling and rendering approach may be referred to as non-foveated rendering. Further, at 208, the method 200 optionally may include performing visibility testing on the hierarchical structure based on the determined position of the feature of the eye.

Figure 4:
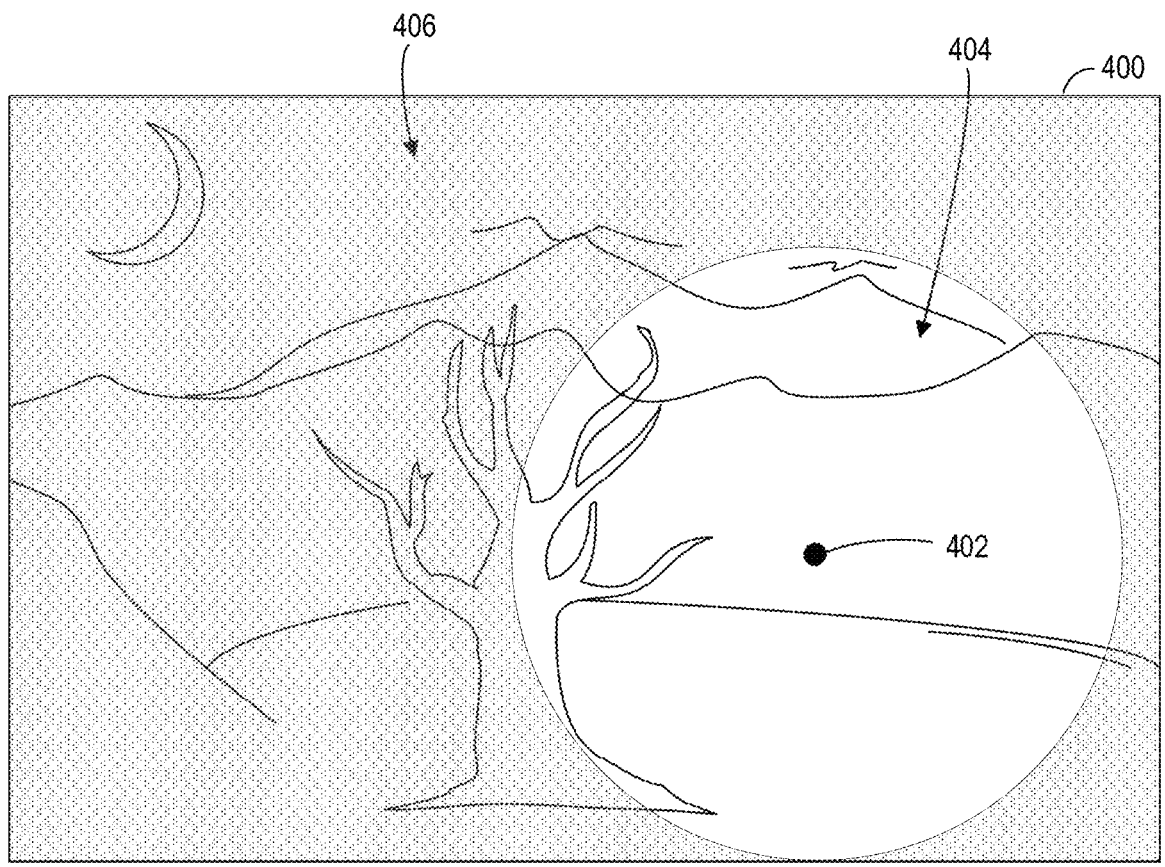
FIG. 4 shows an example image divided into different regions based on a determined eye-feature position for visibility testing.

FIG. 4 shows an example image 400 that is divided into different regions based on a tracked position of a fovea of a retina of an eye. A gaze target on the image 400 is indicated at 402. A foveal region 404 of the image 400 is centered on the gaze target 402, and a peripheral region 406 of the image 400 falls outside the perimeter of the foveal region 404. In such implementations, visibility testing may be performed at a finer granularity in the foveal region 404 and on a coarser granularity in the peripheral region 406, where the perceptive power of the eye is reduced. The granularity of the visibility testing may be varied in any suitable manner. In one example, a test area (or pixel size for sub-pixel testing) may be smaller in regions closer to the position of the feature of the eye (e.g., the foveal region 404), and may be larger in regions further from the position of the feature of the eye (e.g., the peripheral region 406).

In some examples, the compute shader(s) may dynamically adjust the size and/or position of the foveal region 404 and the peripheral region 408 of the image 400 based on the determined position of the fovea by the eye tracker to allow for additional triangles to be culled in the peripheral regions of the image for additional performance gains. It will be appreciated that the image frame may be divided into any suitable number of different regions with different levels of visibility testing granularity.

In some cases, the primary visibility testing performed at step 204 may falsely cull triangles that are actually visible in the current image frame. Such triangles may be referred to as false negative triangles. To compensate for the potential inaccuracies of the primary visibility testing, at 210, the method 200 optionally may include performing, via the one or more compute shaders, secondary visibility testing on triangles and/or nodes of the hierarchical structure that failed the primary visibility testing to identify false negative triangles and/or nodes that are visible in the current image frame. For example, some or all of the method 300 shown in FIG. 3 may be performed as part of performing optional step 210 of the method 200.

In some implementations, at 212, the method 200 optionally may include performing secondary visibility testing on the hierarchical structure based on the determined position of the feature of the eye. In such implementations, secondary visibility testing may be performed at a finer granularity in a region closer to the determined position of the feature of the eye and at a coarser granularity in a region further from the determined position of the feature of the eye. The granularity of the visibility testing may be varied in any suitable manner. In one example, a test area may be smaller in regions closer to the position of the feature of the eye, and may be larger in regions further from the position of the feature of the eye.

At 212, the method 200 includes rendering the triangles identified from the visibility testing in the current image frame. In implementations where primary and secondary visibility testing is performed on the hierarchical structure, visible triangles identified as a resulting both of the tests may be rendered. By performing the primary and secondary visibility testing with the compute shaders of the computing system, non-visible triangles may be culled for efficient rendering of imagery with minimal or no visual artifacts.

In some implementations, the method 200 may be performed to render stereo images for different eyes of a viewer. The stereo images may be rendered based on the same high-density triangle mesh, but with different perspectives corresponding to the different positions of the eye. In such implementations, the triangle mesh may be loaded from memory to the compute shader(s) only one time (at step 202), and the culling and rendering steps (e.g., steps 204-214) may be performed twice (once for each eye). Since the triangle mesh is loaded from memory to the compute shader(s) once and processed twice to render the stereo images, memory loading time may be reduced relative to an approach where the triangle mesh is loaded from memory to the compute shader(s) each time an image is rendered.

It will be understood that some of the steps described and/or illustrated herein may in some implementations be omitted without departing from the scope of this disclosure. Likewise, the indicated sequence of the steps may vary, and is provided for ease of illustration and description. For example, in some implementations, when the method 300 is performed as part of the secondary visibility testing in step 210 of the method 200 of FIG. 2, the node-level visibility testing may be performed only on nodes (e.g., bounding volumes) that did not pass the depth test in the primary visibility testing but passed the subpixel test.

Figure 5:
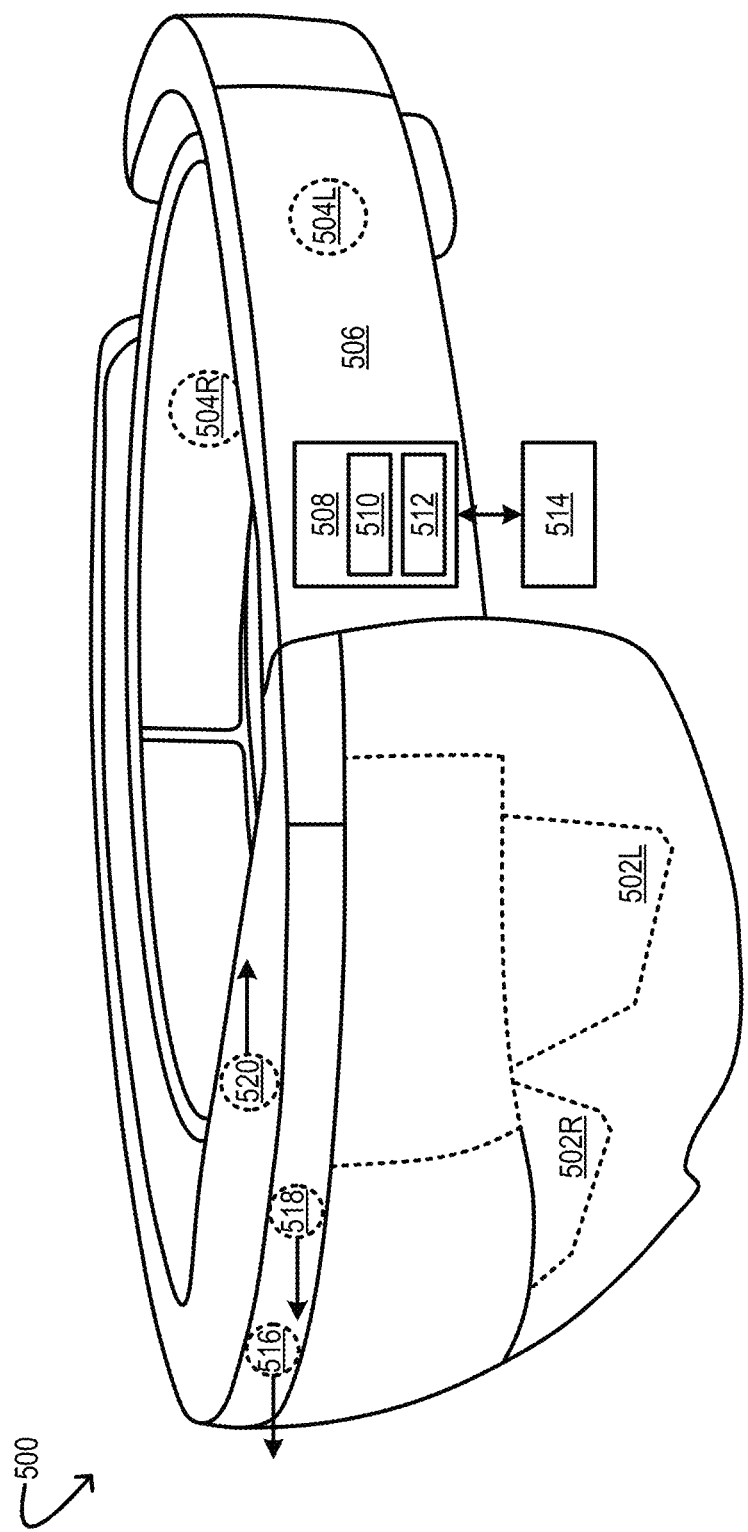
FIG. 5 shows an example near-eye display system.

FIG. 5 shows aspects of a stereoscopic, near-eye display system 500 that may be configured to display stereo images rendered according to the herein described efficient rendering approach. The display system includes right and left display windows 502R and 502L, right and left over-the-ear loudspeakers 504R and 504L, and a frame 506 configured to rest on a wearer's head. Each of the right and left display windows includes display-projection componentry configured to project computerized display imagery into the wearer's field of view (FOV). In some implementations, the right and left display windows are wholly or partially transparent from the perspective of the wearer, to give the wearer a clear view of his or her surroundings for an augmented reality (AR) experience. In some implementations, the right and left display windows are opaque, such that the wearer is completely absorbed in the virtual-reality (VR) imagery provided via the display system, which optionally can be admixed with real imagery captured by a scene-facing camera. In some implementations, the opacity of the right and left display windows is controllable dynamically via a dimming filter. A substantially see-through display window, accordingly, may be switched to full opacity for a fully immersive mixed reality (MR) experience.

Display system 500 includes an on-board computer 508 and an on-board communication system 512. In some implementations, the on-board computer is configured to render the computerized display imagery, which is provided to right and left display windows 502. In some implementations, such rendering is controlled, in whole or in part, by data received through the on-board communication system. In some implementations, such data may be transmitted by off-board computer 524 via communication with the communication system 512. The off-board computer may be a game console, desktop computer, or server system, for example. In other implementations, the off-board computer may be a laptop or tablet computer, smartphone, hand-held gaming device, etc. Display imagery or data controlling the rendering of display imagery may be communicated in any manner from off-board computer 514 to on-board computer 508. Signal encoding such data may be carried over a wired or wireless communication link between communication systems of the respective computers. In some implementations, some or all of the functionality here ascribed to off-board computer 514 may be enacted instead in on-board computer 508.

When display system 510 is in operation, computer 508 sends appropriate control signals to right display window 502R that cause the right display window to form a right display image. Likewise, the computer sends appropriate control signals to left display window 502L that cause the left display window to form a left display image. The wearer of the display system views the right and left display images through right and left eyes, respectively. When the right and left display images are composed and presented in an appropriate manner, the wearer experiences the illusion of virtual imagery—i.e., one or more virtual objects at specified positions, and having specified 3D content and other display properties. Such virtual imagery may have any desired complexity; it may, for example, comprise a complete virtual scene having both foreground and background portions.

Display system 500 optionally may include a pose sensing system or position-sensing componentry 510 usable to determine the position and orientation of the display system in an appropriate frame of reference. In some implementations, the position-sensing componentry returns a six degrees-of-freedom (6DOF) estimate of the three Cartesian coordinates of the display system plus a rotation about each of the three Cartesian axes. To this end, the position-sensing componentry may include any, some, or each of an accelerometer, gyroscope, magnetometer, and global-positioning system (GPS) receiver. The output of the position-sensing componentry may be used to map the position, size, and orientation of virtual display objects (defined globally) onto the right and left display windows 502 of the display system.

Display system 500 optionally may include a world-facing machine vision system comprising a color or monochrome flat-imaging camera 516 and a depth-imaging camera 518. The term 'camera' refers herein to any machine-vision component having at least one optical aperture and sensor array configured to image a scene or subject. The depth-imaging camera may be configured to acquire a time-resolved sequence of depth maps of a scene or subject. As used herein, the term 'depth map' refers to an array of pixels registered to corresponding regions (Xi, Yi) of an imaged scene, with a depth value Zi indicating, for each pixel, the depth of the corresponding region. 'Depth' is defined as a coordinate parallel to the optical axis of the camera, which increases with increasing distance from the camera. Operationally, the depth-imaging camera may be configured to acquire 2D image data, from which a depth map is obtained via downstream processing. The term 'depth video' refers herein to a time-resolved sequence of depth maps.

In some implementations, discrete flat-imaging and depth-imaging cameras may be arranged with parallel optical axes oriented in the same direction. In some implementations, image or video output from the flat-imaging and depth-imaging cameras may be co-registered and combined into a unitary (e.g., RGB+depth) data structure or stream. In examples in which depth-imaging camera is a suitably configured ToF depth-imaging camera, a data stream representing both depth and brightness (e.g., IR+depth) may be available by combining outputs differing in phase.

In some implementations, an object-recognition engine is arranged downstream of the world-facing machine-vision system. Using image-identification algorithms, the object-recognition engine may be configured to compare objects resolved by the machine vision system to a plurality of objects stored in a database or defined heuristically, and to identify a match. For some objects, the object-recognition engine may identify a generic match (this object is a person) and/or a specific match (this object is a particular person associated with a particular computer identity).

The display system 500 optionally may include an eye tracker 520 configured to track a current position of a feature of an eye of the wearer. In some examples, the eye tracker 520 may be configured to independently track features in each of the wearer's eye. For example, the eye tracker 520 may include a light source that projects light onto the wearer's eye, and the eye tracker 520 may include an image sensor that captures light reflected from a cornea of the user's eye with which glints and/or other features can be identified to determine the position of the tracked feature. In some examples, the eye tracker 520 may be configured to determine a diameter and/or perimeter of a feature of the eye. The eye tracker 520 may be configured to determine the position of any suitable feature of the wearer's eye. Further, the eye tracker 520 may employ any suitable eye tracking technology.

No aspect of the foregoing description or drawings should be interpreted in a limiting sense, for numerous variants lie within the spirit and scope of this disclosure. For instance, although display system 500 of FIG. 5 is a near-eye display system in which the right display image appears behind a right display window, and the left display image appears behind a left display window, the right and left display images may also be formed on the same screen. In a stereo display system for a laptop computer, or home-theatre system, for example, the right display image may be formed on a display screen using light of one polarization state, and the left display image may be formed on the same display screen using light of different polarization state. Orthogonally aligned polarization filters in the user's eyewear may be used to ensure that each display image is received in the appropriate eye.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
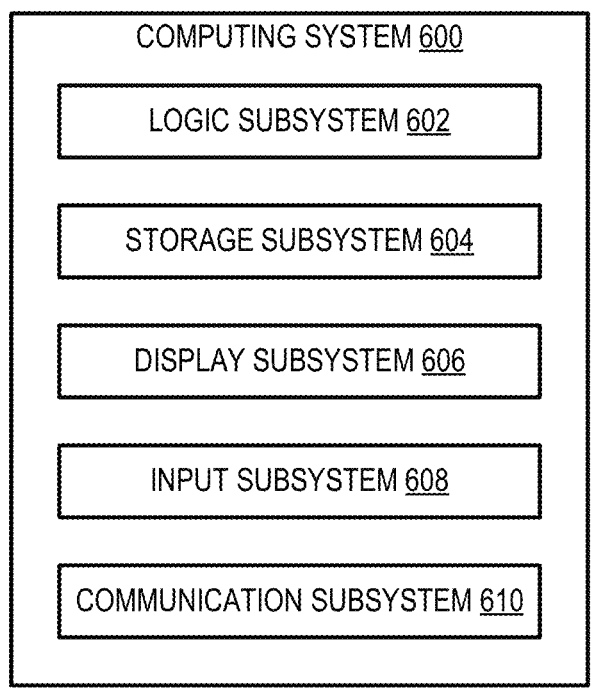
FIG. 6 shows an example computing system

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 600 may be representative of computing system 100 in FIG. 1, and near-eye display system 500 in FIG. 5.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem 602 may be configured to execute instructions that are part of one or more applications, services, or other logical constructs. The logic subsystem 602 may include one or more hardware processors configured to execute software instructions. Additionally or alternatively, the logic subsystem 602 may include one or more hardware or firmware devices configured to execute hardware or firmware instructions. Processors of the logic subsystem 602 may be single-core or multi-core, and the instructions executed thereon may be configured for sequential, parallel, and/or distributed processing. Individual components of the logic subsystem 602 optionally may be distributed among two or more separate devices, which may be remotely located and/or configured for coordinated processing. Aspects of the logic subsystem 602 may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem 602. When the storage subsystem 604 includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem 602 executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 602 and the storage subsystem 604 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem 610 may be configured for communication via personal-, local- and/or wide-area networks.

In another example, a computing system comprises a logic subsystem, and a data-holding subsystem comprising computer-readable instructions executable by the logic subsystem to load, from memory to one or more compute shaders, a hierarchical structure representing a plurality of polygons of a high-density polygon mesh, the high-density polygon mesh representing a three-dimensional (3D) model, for each eye of a viewer: perform visibility testing on the hierarchical structure to identify polygons and/or nodes of polygons that are visible in a current image frame, and render the polygons identified from the visibility testing in the current image frame, such that the hierarchical structure is loaded from memory to the one or more compute shaders once and processed twice to render stereo image frames for the viewer's eyes. In this example and/or other examples, the hierarchical structure may include a plurality of levels, each level of the plurality of levels including one or more nodes, each node of the one or more nodes including one or more polygons, the visibility testing may be performed on nodes of the hierarchical structure to identify nodes including visible polygons. In this example and/or other examples, performing visibility testing may include performing back-face determinant testing on nodes of the hierarchical structure. In this example and/or other examples, performing visibility testing may include performing sub-pixel testing on nodes of the hierarchical structure. In this example and/or other examples, performing visibility testing may include performing frustum testing on nodes of the hierarchical structure. In this example and/or other examples, performing visibility testing may include performing depth testing on nodes of the hierarchical structure based on a depth pyramid to identify nodes including visible polygons. In this example and/or other examples, the depth pyramid may be generated by re-projecting depth data for a previously-rendered image frame of the 3D model based on a change in virtual perspective of a virtual camera associated with the eye between the previously-rendered image frame and the current image frame, wherein each eye of the viewer is associated with a different virtual camera having a different virtual perspective of the 3D model. In this example and/or other examples, the depth testing may be primary depth testing, and performing visibility testing may further include updating the depth data based on a current virtual perspective of the virtual camera for the current image frame to generate an updated depth pyramid, performing secondary depth testing using the updated depth pyramid on polygons and/or nodes of polygons of the hierarchical structure that failed the primary depth testing to identify false negative polygons that are visible in the current image frame, and the false negative polygons identified from the secondary depth testing may be rendered in the current image frame. In this example and/or other examples, rendering of at least some of the polygons identified from the visibility testing may be performed by a rendering pipeline of the computing system. In this example and/or other examples, rendering the polygons identified from the visibility testing in the current image frame may include dynamically selecting one or more of the polygons based on a size of the one or more polygons, and rasterizing the one or more polygons using the one or more compute shaders of the computing system. In this example and/or other examples, the hierarchical structure may be a bound volume hierarchy. In this example and/or other examples, the computer-readable instructions may be further executable by the logic subsystem to determine, via an eye tracker, a position of a feature of an eye, the current image frame may include a plurality of regions that are dynamically determined based on the position of the feature of the eye, visibility testing in regions closer to the position of the feature of the eye may be performed on the hierarchical structure with a finer granularity, and visibility testing in regions further from the position of the feature of the eye may be performed on the hierarchical structure with a coarser granularity.

In another example, a method for rendering stereo imagery based on a high-density triangle mesh representing a three-dimensional (3D) model comprises loading a hierarchical structure representing a plurality of triangles of the high-density triangle mesh from memory to one or more compute shaders, for each eye of a viewer: re-projecting depth data for a previously-rendered image frame of the 3D model based on a change in virtual perspective of a virtual camera associated with the eye between the previously-rendered image frame and a current image frame to generate a depth pyramid, wherein each eye of the viewer is associated with a different virtual camera having a different virtual perspective of the 3D model, performing, via the one or more compute shaders, primary visibility testing including primary depth testing using the depth pyramid on the hierarchical structure to identify triangles and/or nodes of triangles that are visible in the current image frame, rendering the triangles identified from the primary visibility testing in the current image frame for the eye, updating the depth data based on a current virtual perspective of the virtual camera for the current image frame to generate an updated depth pyramid, performing, via the one or more compute shaders, secondary visibility testing including secondary depth testing using the updated depth pyramid on triangles and/or nodes of triangles of the hierarchical structure that failed the primary visibility testing to identify false negative triangles that are visible in the current image frame, and rendering the false negative triangles identified from the secondary visibility testing in the current image frame for the eye, such that the hierarchical structure is loaded from memory to the one or more compute shaders once and processed twice to render stereo image frames for the viewer's eyes. In this example and/or other examples, performing primary visibility testing may include performing at least one of backface determinant testing, sub-pixel testing, and frustum testing on nodes and/or triangles of the hierarchical structure. In this example and/or other examples, performing secondary visibility testing may include performing at least one of backface determinant testing, sub-pixel testing, and frustum testing on nodes and/or triangles of the hierarchical structure. In this example and/or other examples, the method may further comprise determining, via an eye tracker, a position of a feature of an eye, the current image frame may include a plurality of regions that are dynamically determined based on the position of the feature of the eye, primary and secondary visibility testing in regions closer to the position of the feature of the eye may be performed on the hierarchical structure with a finer granularity, and primary and secondary visibility testing in regions further from the position of the feature of the eye may be performed on the hierarchical structure with a coarser granularity. In this example and/or other examples, rendering the triangles identified from the primary visibility testing and rendering of the false negative triangles identified from the secondary visibility testing may include dynamically selecting one or more triangles based on a size of the one or more triangles, and rasterizing the one or more triangles using the one or more compute shaders.

In another example, a computer-readable storage media comprising computer-readable instructions executable by a processor of a computing system to: load, from memory to one or more compute shaders, a hierarchical structure representing a plurality of polygons of a high-density polygon mesh, the high-density polygon mesh representing a three-dimensional (3D) model, for each eye of a viewer: perform visibility testing on the hierarchical structure to identify polygons and/or nodes of polygons that are visible in a current image frame, and render the polygons identified from the visibility testing in the current image frame, such that the hierarchical structure is loaded from memory to the one or more compute shaders once and processed twice to render stereo image frames for the viewer's eyes. In this example and/or other examples, rendering the polygons identified from the visibility testing in the current image frame may include dynamically selecting one or more of the polygons based on a size of the one or more polygons, and rasterizing the one or more polygons using the one or more compute shaders. In this example and/or other examples, the computer-readable storage media may include computer-readable instructions executable by the processor to: determine, via an eye tracker, a position of a feature of an eye, the current image frame may include a plurality of regions that are dynamically determined based on the position of the feature of the eye, visibility testing in regions closer to the position of the feature of the eye may be performed on the hierarchical structure with a finer granularity, and visibility testing in regions further from the position of the feature of the eye may be performed on the hierarchical structure with a coarser granularity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
  a logic subsystem; and
  a data-holding subsystem comprising computer-readable instructions executable by the logic subsystem to:
    load, from memory to one or more compute shaders, a hierarchical structure representing a plurality of polygons of a high-density polygon mesh, the high-density polygon mesh representing a three-dimensional (3D) model;
    for a left eye of a viewer:
      perform left eye visibility testing, via the one or more compute shaders, on the hierarchical structure to identify polygons and/or nodes of polygons that are visible in a current left eye image frame corresponding to a left eye perspective of the viewer; and
      render the polygons identified from the left eye visibility testing in the current left eye image frame;
    for a right eye of the viewer:
      perform right eye visibility testing, via the one or more compute shaders, on the hierarchical structure to identify polygons and/or nodes of polygons that are visible in a current right eye image frame corresponding to a right eye perspective of the viewer; and
      render the polygons identified from the right eye visibility testing in the current right eye image frame, such that the hierarchical structure is loaded from memory to the one or more compute shaders once and processed twice to render stereo left eye and right eye image frames for the viewer's eyes.

2. The computing system of claim 1, wherein the hierarchical structure includes a plurality of levels, each level of the plurality of levels including one or more nodes, each node of the one or more nodes including one or more polygons, wherein the left eye visibility testing and the right eye visibility testing each is performed on nodes of the hierarchical structure to identify nodes including visible polygons.

3. The computing system of claim 1, wherein performing the left eye visibility testing and the right eye visibility testing includes performing backface determinant testing on nodes of the hierarchical structure.

4. The computing system of claim 1, wherein performing the left eye visibility testing and the right eye visibility testing includes performing sub-pixel testing on nodes of the hierarchical structure.

5. The computing system of claim 1, wherein performing the left eye visibility testing and the right eye visibility testing includes performing frustum testing on nodes of the hierarchical structure.

6. The computing system of claim 1, wherein performing the left eye visibility testing and the right eye visibility testing includes performing depth testing on nodes of the hierarchical structure based on left eye and right eye depth pyramids to identify nodes including visible polygons.

7. The computing system of claim 6, wherein each of the left eye and right eye depth pyramids is generated by re-projecting depth data for previously-rendered left eye and right eye image frames of the 3D model based on a change in virtual perspective of a virtual camera associated with the corresponding eye between the previously-rendered left eye and right eye image frames and the current left eye and right eye image frames, wherein each eye of the viewer is associated with a different virtual camera having a different virtual perspective of the 3D model.

8. The computing system of claim 6, wherein the depth testing is primary depth testing, and wherein performing the left eye visibility testing and the right eye visibility testing further includes updating the depth data based on a current virtual perspective of the virtual camera for the current left eye and right eye image frames to generate an updated depth pyramid, performing secondary depth testing using the updated depth pyramid on polygons and/or nodes of polygons of the hierarchical structure that failed the primary depth testing to identify false negative polygons that are visible in the current left eye and right eye image frames, and wherein the false negative polygons identified from the secondary depth testing are rendered in the current left eye and right eye image frames.

9. The computing system of claim 1, wherein rendering of at least some of the polygons identified from the left eye visibility testing and the right eye visibility testing is performed by a rendering pipeline of the computing system.

10. The computing system of claim 1, wherein rendering the polygons identified from the left eye visibility testing and the right eye visibility testing in the current left eye and right eye image frames includes dynamically selecting one or more of the polygons based on a size of the one or more polygons, and rasterizing the one or more polygons using the one or more compute shaders of the computing system.

11. The computing system of claim 1, wherein the hierarchical structure is a bound volume hierarchy.

12. The computing system of claim 1, wherein the computer-readable instructions are further executable by the logic subsystem to:
determine, via an eye tracker, a position of a feature of the left eye and a position of a feature of the right eye;
wherein the current left eye and right eye image frames each includes a plurality of regions that are dynamically determined based on the position of the feature of the left eye and the position of the feature of the right eye, wherein visibility testing in regions closer to the position of one or more of the feature of the left eye or the position of the feature of the right eye is performed on the hierarchical structure with a finer granularity, and wherein visibility testing in regions further from the position of one or more of the feature of the left eye or the position of the feature of the right eye is performed on the hierarchical structure with a coarser granularity.

13. A method for rendering stereo imagery based on a high-density triangle mesh representing a three-dimensional (3D) model, the method comprising:
loading a hierarchical structure representing a plurality of triangles of the high-density triangle mesh from memory to one or more compute shaders;
for each eye of a viewer:
re-projecting depth data for a previously-rendered image frame of the 3D model based on a change in virtual perspective of a virtual camera associated with the eye between the previously-rendered image frame and a current image frame to generate a depth pyramid, wherein each eye of the viewer is associated with a different virtual camera having a different virtual perspective of the 3D model;
performing, via the one or more compute shaders, primary visibility testing including primary depth testing using the depth pyramid on the hierarchical structure to identify triangles and/or nodes of triangles that are visible in the current image frame;
rendering the triangles identified from the primary visibility testing in the current image frame for the eye;
updating the depth data based on a current virtual perspective of the virtual camera for the current image frame, the current virtual perspective being different from the virtual perspective of the virtual camera for the previously-rendered image frame, to generate an updated depth pyramid;
performing, via the one or more compute shaders, secondary visibility testing including secondary depth testing using the updated depth pyramid on triangles and/or nodes of triangles of the hierarchical structure that failed the primary visibility testing to identify false negative triangles that are visible in the current image frame; and
rendering the false negative triangles identified from the secondary visibility testing in the current image frame for the eye, such that the hierarchical structure is loaded from memory to the one or more compute shaders once and processed twice to render stereo image frames for the viewer's eyes.

14. The method of claim 13, wherein performing primary visibility testing includes performing at least one of backface determinant testing, sub-pixel testing, and frustum testing on nodes and/or triangles of the hierarchical structure.

15. The method of claim 13, wherein performing secondary visibility testing includes performing at least one of backface determinant testing, sub-pixel testing, and frustum testing on nodes and/or triangles of the hierarchical structure.

16. The method of claim 13, further comprising:
determining, via an eye tracker, a position of a feature of an eye;
wherein the current image frame includes a plurality of regions that are dynamically determined based on the position of the feature of the eye, wherein primary and secondary visibility testing in regions closer to the position of the feature of the eye are performed on the hierarchical structure with a finer granularity, and wherein primary and secondary visibility testing in regions further from the position of the feature of the eye are performed on the hierarchical structure with a coarser granularity.

17. The method of claim 13, wherein rendering the triangles identified from the primary visibility testing and rendering of the false negative triangles identified from the secondary visibility testing includes dynamically selecting one or more triangles based on a size of the one or more triangles, and rasterizing the one or more triangles using the one or more compute shaders.

18. A computer-readable storage device comprising computer-readable instructions executable by a processor of a computing system to:
  load, from memory to one or more compute shaders, a hierarchical structure representing a plurality of polygons of a high-density polygon mesh, the high-density polygon mesh representing a three-dimensional (3D) model;
  for a left eye of a viewer:
    perform left eye visibility testing, via the one or more compute shaders, on the hierarchical structure to identify polygons and/or nodes of polygons that are visible in a current left eye image frame corresponding to a left eye perspective of the viewer; and
    render the polygons identified from the left eye visibility testing in the current left eye image frame;
  for a right eye of the viewer:
    perform right eye visibility testing, via the one or more compute shaders, on the hierarchical structure to identify polygons and/or nodes of polygons that are visible in a current right eye image frame corresponding to a right eye perspective of the viewer; and
    render the polygons identified from the right eye visibility testing in the current right eye image frame, such that the hierarchical structure is loaded from memory to the one or more compute shaders once and processed twice to render stereo left eye and right eye image frames for the viewer's eyes.

19. The computer-readable storage device of claim 18, wherein rendering the polygons identified from the left eye visibility testing and the right eye visibility testing in the current left eye and right eye image frames includes dynamically selecting one or more of the polygons based on a size of the one or more polygons, and rasterizing the one or more polygons using the one or more compute shaders.

20. The computer-readable storage device of claim 18, wherein the computer-readable instructions are further executable by the processor to:
  determine, via an eye tracker, a position of a feature of the left eye and a position of the feature of the right eye;
  wherein the current left eye and right eye image frames each includes a plurality of regions that are dynamically determined based on the position of the feature of the left eye and the position of the feature of the right eye, wherein visibility testing in regions closer to the position of one or more of the feature of the left eye or the position of the feature of the right eye is performed on the hierarchical structure with a finer granularity, and wherein visibility testing in regions further from the position of one or more of the feature of the left eye or the position of the feature of the right eye is performed on the hierarchical structure with a coarser granularity.

* * * * *